United States Patent [19]
Hara et al.

[11] Patent Number: 6,060,611
[45] Date of Patent: May 9, 2000

[54] EPOXY RESIN COMPOSITION

[75] Inventors: Yoshinori Hara; Hiroko Inagaki, both of Tokyo; Mareki Miura, Yokkaichi; Yoshinori Nakanishi, Yokkaichi; Yoshinobu Ohnuma, Yokkaichi, all of Japan

[73] Assignee: Mitsubishi Chemical Corp., Tokyo, Japan

[21] Appl. No.: 09/223,481

[22] Filed: Dec. 30, 1998

[30] Foreign Application Priority Data

Jan. 16, 1998 [JP] Japan ................................. 10-018324

[51] Int. Cl.$^7$ ....................... C07D 301/03; C07D 303/23
[52] U.S. Cl. ............................. 549/540; 549/560
[58] Field of Search ..................... 549/540, 560

[56] References Cited

U.S. PATENT DOCUMENTS 3,336,241  8/1967  Shokal ......................................... 260/2
4,847,394  7/1989  Schuster ................................... 549/540
5,530,147  6/1996  Wettling et al. ......................... 549/540

FOREIGN PATENT DOCUMENTS 08053370  2/1996  Japan.

*Primary Examiner*—Ba K. Trinh

[57]  ABSTRACT

To provide an epoxy resin composition which can provide a cured resin which is excellent in weatherability and electric properties, and which is useful as a resin for coatings, an encapsulant, a casting material, an electric insulator, etc. An epoxy resin composition which contains a hydrogenated epoxy resin obtained by hydrogenation of an aromatic epoxy resin, wherein the hydrogenated epoxy resin has a hydrogenation ratio in an aromatic ring of not less than 85%, a loss ratio of epoxy groups of not more than 20%, and a total chlorine content of not more than 0.3% by weight.

8 Claims, No Drawings

EPOXY RESIN COMPOSITION

The present invention relates to an epoxy resin composition which can provide a cured product which is useful as a resin for coatings, an encapsulant, a casting material, and an electric insulator, and which is excellent in weatherability, electric properties, etc., and process of producing such epoxy resin.

An epoxy resin has been employed in a variety of fields because it is excellent in heat resistance, adhesion, water resistance, mechanical strength, electric properties, etc. As the epoxy resin, there are usually employed aromatic epoxy resins such as a diglycidyl ether of bisphenol A and a phenol novolak type epoxy resin.

However, because the above-described aromatic epoxy resins are poor in weatherability, for uses in which weatherability is required, there is employed an alicyclic epoxy resin obtained by epoxidation of alcohols such as hydrogenated bisphenol A, etc., or an alicyclic epoxy resin such as 3,4-epoxycyclohexyl methyl-3',4'-epoxycyclohexanecarboxylate, etc. obtained by oxidation of a cycloolefin with peracetic acid.

However, although weatherability is improved in an alicyclic epoxy resin obtained by reaction of alcohols with epichlorohydrin under the presence of a catalyst such as Lewis acids, it contains a large amount of chlorine (total chlorine content of approximately 5% by weight), and it is unsuitable for electric uses and uses in which weatherability is highly required. Therefore, although there has been made an attempt to obtain an epoxy resin having a low content of chlorine by reaction of alcohols with epichlorohydrin under the presence of a phase transfer catalyst, the alicyclic epoxy resin having a low content of chlorine has not been obtained yet.

On the other hand, as the alicyclic epoxy resin is poor in reactivity with an amine-based curing agent, a long period of time is required in curing. Further, a cured product from the epoxy resin is remarkably poor in crack resistance, and there is a problem that it yellows by an ultraviolet ray because of a cyclohexene structure contained in the resin.

Still further, there is proposed a method for the preparation of an alicyclic epoxy resin (U.S. Pat. No. 3,336,241 Specification, U.S. Pat. No. 4,847,394 Specification, and JP-A-08053370 Official Gazette) by hydrogenation of an aromatic ring in an aromatic epoxy resin in the presence of a catalyst in which rhodium or ruthenium is carried on an activated carbon, or a homogeneous ruthenium catalyst.

However, the method using the catalyst in which rhodium or ruthenium is carried on an activated carbon (amorphous carbon) includes a problem that a hydrogenation ratio of an aromatic ring is low because of a low activity in the catalyst, and a fair amount of epoxy groups are decomposed by hydrogenation. Also, the method using the homogeneous ruthenium catalyst includes a problem that although activity and selectivity in the catalyst are excellent, it is difficult to separate the ruthenium catalyst which is high in price from a product and, moreover, a large amount of chlorine and metallic ruthenium remains in an epoxy resin obtained, resulting in that it cannot be employed as an epoxy resin for electric-electronic materials.

The present invention aims at providing an epoxy resin composition which contains an epoxy resin and a curing agent for an epoxy resin, and from which there can be provided a cured product having an excellent weatherability without loss of heat resistance, and in which a catalyst for hydrogenation does not remain, and total chlorine content is decreased to not more than 0.3% by weight.

(1) The present invention relates to an epoxy resin composition which contains a hydrogenated epoxy resin produced by hydrogenation of an aromatic epoxy resin in which the hydrogenated epoxy resin has a hydrogenation ratio in an aromatic ring of not less than 85%, a loss ratio of epoxy groups of not more than 20%, and a total chlorine content of not more than 0.3% by weight.

(2) The epoxy resin composition of the present invention can be mixed with 0.01–200 parts by weight of a curing agent for the epoxy resin based on 100 parts by weight of the above-described hydrogenated epoxy resin.

(3) The present invention relates to a process of producing a hydrogenation epoxy resin comprising the steps of hydrogenating an aromatic epoxy resin which is dissolved into an ether-based solvent in the presence of a catalyst under pressurization, in which catalyst comprises rhodium or ruthenium carried on a graphite.

(4) The hydrogenated epoxy resin of the invention can be a liquid epoxy resin which is produced by hydrogenating a bisphenol A based epoxy resin, and which has a viscosity of not more than 2.5 Pa.s at 25° C. which is measured by a rotation-type viscometer.

(5) The hydrogenated epoxy resin of the invention can also be an epoxy resin produced by hydrogenating a novolak type epoxy resin having an epoxy equivalent ranging in 150–230 represented by general formula (1) described below,

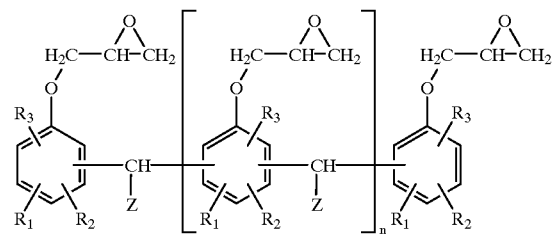

(1)

in the formula, $R^1$, $R^2$, and $R^3$ represent a hydrogen atom or an alkyl group having a carbon number of 1–4, n is the number of 0–10, and Z represents a hydrogen atom or a formula,

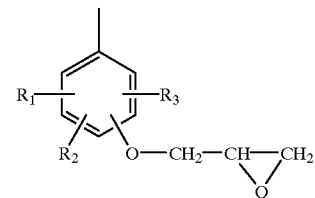

(in the formula, $R^1$, $R^2$, and $R^3$ represent a hydrogen atom or an alkyl group having a carbon number of 1–4).

(6) The present invention relates to an epoxy resin composition of the present invention as described in any one of the above items (1)–(5), in which the hydrogenated epoxy resin has the total chlorine content of not more than 0.3w by weight and the content of hydrolyzable chlorine of not more than 0.1% by weight.

(7) The present invention relates to an epoxy resin composition of the present invention as described in any one of the above items (1)–(6), in which the curing agent for an epoxy resin is a compound selected from amines, acid anhydrides, polyvalent phenols, imidazoles, salts of a Br nsted acid, dicyandiamides, hydrazides of an organic acid, polymercaptans, and organic phosphines.

(8) The present invention relates to an epoxy resin composition of present invention as described in any one of the above items (1)–(7), in which the curing agent for an epoxy resin has the content of an aromatic ring occupied in the total curing agents of not more than 10% by weight.

Hereinafter, the present invention is illustrated in detail.

Component (A): Hydrogenated Epoxy Resin

The hydrogenated epoxy resin which is the component (A) in the present invention is an epoxy resin obtained by hydrogenation of an aromatic epoxy resin, and which has a hydrogenation ratio of an aromatic ring of not less than 85%, a loss ratio of epoxy groups of not more than 20%, and a total chlorine content of not more than 0.3% by weight.

The hydrogenation ratio of an aromatic ring in the epoxy resin, which is a proportion changing from an aromatic ring to an alicyclic ring, can be measured by a nuclear magnetic resonance analysis.

The loss ratio of epoxy groups is a proportion of decomposition of epoxy groups by hydrogenation, and the loss ratio of epoxy groups can be measured by a titration with perchloric acid.

Also, the total chlorine is a total amount of organic chlorines and inorganic chlorines contained in the epoxy resin, and it can be measured by a titration with silver nitrate after allowing the chlorines in the epoxy resin to react with sodium biphenyl.

The content of hydrolyzable chlorine in the hydrogenated epoxy resin which is the component (A) is preferably not more than 0.1% by weight in use as an encapsulant for electronic parts.

In the case that the hydrogenation ratio of an aromatic ring is less than 85%, weatherability remarkably and unpreferably lowers in a cured product from the epoxy resin composition. Also, in the case that the loss ratio of epoxy groups exceeds 20%, heat resistance remarkably and unpreferably lowers in a cured product from the epoxy resin composition. Further, in the case that the total chlorine content exceeds 0.3% by weight, moisture resistance, electric properties at high temperatures, and weatherability unpreferably lower in uses as an epoxy resin for electric-electronic materials. (Method for the preparation of the hydrogenated epoxy resin).

The hydrogenated epoxy resin which is the component (A) in the present invention can be obtained by selectively conducting hydrogenation of an aromatic epoxy resin in the presence of a catalyst under pressurization.

As the aromatic epoxy resin, there are exemplified a bisphenol type epoxy resin such as diglycidyl ether of bisphenol A, diglycidylether of bisphenol F, and diglycidylether of bisphenol S; a novolak-type epoxy resin such as a phenol novolak epoxide, a cresol novolak epoxide, and a hydroxybenzaldehyde phenol novolak epoxide; and a multi-functional type epoxy resin such as a glycidyl ether of tetrahydroxyphenylmethane, a glycidyl ether of tetrahydroxy benzophenone, an epoxidized polyvinylphenol.

Of those, there are preferred the bisphenol A-type epoxy resin and the novolak-type epoxy resin represented by the general formula (1) in view of a low content of chlorines,

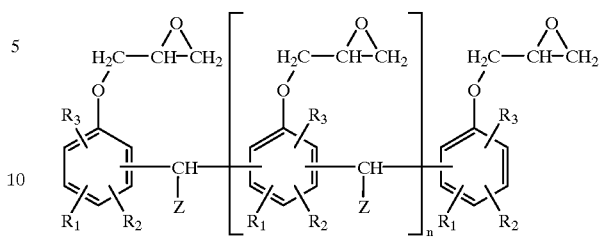

(1)

in the formula, $R^1$, $R^2$, and $R^3$ represent a hydrogen atom or an alkyl group having a carbon number of 1–4, n is the number of 0–10, and Z represents a hydrogen atom or the formula,

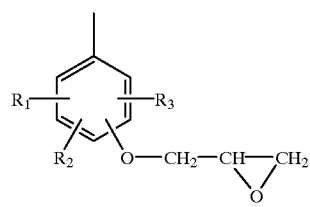

(in the formula, $R^1$, $R^2$, and $R^3$ represent a hydrogen atom or an alkyl group having a carbon number of 1–4).

Further, for uses which particularly require a well-balance between heat resistance and moisture resistance, there are more preferably employed the hydrogenated bisphenol A type epoxy resin having a viscosity of not more than 2.5 Pa.s at 25° C. which is measured by a rotation-type viscometer, and a novolak type epoxy resin represented by the general formula (1), and particularly, the epoxy resin prepared by hydrogenation of an aromatic epoxy resin in which $R^1$, $R^2$, and $R^3$ are a hydrogen atom or a methyl group, and which has an epoxy equivalent of 150–230.

The hydrogenated epoxy resin which is the component (A) in the present invention is prepared by selective hydrogenation of an aromatic ring using an ether-based organic solvent such as tetrahydrofran, dioxane, etc., in the presence of a catalyst in which rhodium or ruthenium is carried on a graphite (a hexagonal crystalline graphite). The graphite which is a carrier to be employed has surface area ranging from 10 $m^2/g$ to 400 $m^2/g$, preferably 50 to 300 $m^2/g$, and more preferably 100 to 250 $m^2/g$. Reaction is conducted in a pressure range of 1–30 MPa, a temperature range of 30–150° C., and a reaction time range of 1–20 hours. After the completion of the reaction, the hydrogenated epoxy resin is obtained by removing through filtration of the catalyst, and by distilling out at reduced pressure until the ether-based organic solvent becomes substantially absent.

Component (B): Curing Agent for an Epoxy Resin

The hydrogenated epoxy resin which is the component (A) in the present invention can be cured using the curing agent for an epoxy resin. As the curing agent for an epoxy resin which is the component (B) to be employed, a usual curing agent for an epoxy resin can be employed, for example, including the following ones.

(1) amines: aliphatic and alicyclic amines such as diethylenetriamine, triethylenetetramine, tetraethylenepentamine, N-aminoethylpiperazine, isophoronediamine, bis(4-aminocyclohexyl)methane, bis(aminomethyl)cyclohexane, m-xylylenediamine, and 3,9-bis(3-aminopropyl)-2,4,8,10-tetraspiro[5,5]undecane; aromatic amines such as metaphenylenediamine, diaminodiphenylmethane, and diaminodiphenylsulfone; and tertiary amines such as benzyldimethylamine, 2,4,6-tris (dimethylaminomethyl)phenol, 1,8-diazabicyclo(5, 4, 0)undecene-7, and 1,5-diazabicyclo(4, 3, 0) nonene-5, and salts thereof.

(2) acid anhydrides: aromatic acid anhydrides such as phthalic anhydride, trimellitic anhydride, and pyromellitic anhydride; and cycloaliphatic acid anhydrides such as tetrahydrophthalic anhydride, methyltetrahydrophthalic anhydride, hexahydrophthalic anhydride, methylhexahydrophthalic anhydride, methylendomethylene tetrahydrophthalic anhydride, dodecenylsuccinic anhydride, and trialkyltetrahydrophthalic anhydride.

(3) polyvalent phenols: catechol, resorcin, hydroquinone, bisphenol F, bisphenol A, bisphenol S, bisphenol, phenol novolaks, cresol novolaks, novolak compounds of a divalent phenol such as bisphenol A, trishydroxyphenyl methanes, aralkyl polyphenols, dicyclopentadiene polyphenols.

(4) polyaminoamides: a polyaminoamide obtained by condensation reaction of the amines in the above item (1) with a dimer acid, for example, Versamides (trade name) 140, 125 (grade names) by Henkel, Ltd.

(5) others: imidazole-based compounds such as 2-methylimidazole, 2-ethyl-4-imidazole, and 2-phenylimidazole, and salts thereof; $BF_3$ complex compounds of an amine; salts of a Br nsted acid such as an aliphatic sulphonium salt and an aromatic sulphonium salt; dicyandiamides; hydrazides of an organic acid such as dihydrazide of adipic acid and dihydrazide of phthalic acid; polymercaptans, and organic phosphine compounds such as triphenylphosphine.

The curing agents for an epoxy resin may be employed solely, and two or more kinds can also be employed.

The above-mentioned curing agents for an epoxy resin are preferably employed so that the content of aromatic rings occupied in the total curing agents is adjusted to not more than 10% by weight. In the case that the content of aromatic rings exceeds 10% by weight, weatherability unpreferably lowers in a cured article from the epoxy resin composition.

Also, for a mixing proportion of the hydrogenated epoxy resin which is the component (A) to the curing agent for an epoxy resin which is the component (B), the curing agent for an epoxy resin which is the component (B) is mixed in a range of 0.01–200 parts by weight, preferably 0.1–150 parts by weight based on 100 parts by weight of the hydrogenated epoxy resin which is the component (A). Outside the above-mentioned range, heat resistance and moisture resistance are not unpreferably well-balanced in a cured product from the epoxy resin composition.

Optional Components

In the epoxy resin composition of the present invention, the following components can optionally be mixed as additives.

(1) Powdered reinforcing materials and fillers, for example, metal oxides such as aluminum oxide and magnesium oxide, metal carbonates such as calcium carbonate and magnesium carbonate, silicone compounds such as powdered diatomaceous earth, a basic magnesium silicate, calcined clays, finely-powdered silica, fused silica, and crystalline silica, metal hydroxides such as aluminum hydroxide, and further, kaoline, mica, powdered quartz, graphite, molybdenum disulfide, etc., and also, fibrous reinforcing materials and fillers, for example, fiberglass, ceramic fibers, carbon fibers, alumina fibers, silicone carbide fibers, boron fibers, polyester fibers, polyamide fibers.

These are mixed in 10–900 parts by weight based on 100 parts by weight of the total of the epoxy resin and the curing agent.

(2) Coloring agents, pigments, flame retardants, for example, titanium dioxide, Iron Black, Molybdenum Red, Navy Blue, Ultramarine Blue, Cadmium Yellow, Cadmium Red, antimony trioxide, red phosphorus, brominated compounds, triphenylphosphate.

These are mixed in 0.1–20 parts by weight based on 100 parts by weight of the total of the epoxy resin and the curing agent.

(3) Further, there can be mixed a variety of curable monomers and oligomers, and synthetic resins for the purpose of improving properties of resins in final coating layers, adhesive layers, molded articles, etc. For example, there are exemplified one or more kinds of diluents for epoxy resins such as monoepoxides, phenol resins, alkyd resins, melamine resins, fluorocarbon resins, vinyl chloride resins, acrylic resins, silicone resins, and polyester resins. Mixing proportion of the resins is an amount range which does not deteriorate inherent properties in the resin composition of the present invention, that is, it is preferably less than 50 parts by weight based on 100 parts by weight of the total of the epoxy resin and the curing agent.

In the present invention, as a means for mixing the epoxy resin, the curing agent for an epoxy resin, and optional components, there are exemplified a melt mixing method while heating, a melt kneading method by a roll or a kneader, a wet mixing method with an appropriate solvent, a dry mixing method, etc.

EXAMPLES

Hereinafter, the present invention is further illustrated in detail by non-limiting Examples and Comparative Examples. It is to be noted that "part" in the Examples means "part by weight".

The content of hydrolyzable chlorine is represented as the amount of a halogen which is removed when heated at a reflux state for 30 minutes after 0.5 g of an epoxy compound is dissolved into 30 ml of dioxane, and 5 ml of 1-normal alcohol solution of potassium hydroxide is added, and which is quantitatively measured by back titration with a solution of silver nitrate.

Preparation Example of a Hydrogenated Epoxy Resin

Preparation Example 1

A 500-milliliter autoclave equipped with an agitator and a thermometer was charged with 100 g of Epikote 828EL (trade name by Yuka Shell Epoxy K.K.: a diglycidyl ether of bisphenol A, a total chlorine content of 0.161% by weight, an epoxy equivalent of 186 g/eq.), 100 g of tetrahydrofran, and 0.5 g of a catalyst (surface area of graphite: 130 m$^2$/g) composed of 5 wt %-rhodium/95 wt %-graphite, followed by conducting reduction reaction while maintaining the conditions of hydrogen pressure of 7 MPa, temperature of 50° C., and rotation speed of 500–800 rpm for 3 hours. After the completion of the reaction, the autoclave was cooled and the catalyst was filtered, followed by distilling out tetrahydrofran at reduced pressure and temperature of 50° C. with an evaporator to obtain 96.5 g of a hydrogenated epoxy resin which is a colorless transparent liquid.

In the hydrogenated epoxy resin, the content of total chlorine was 0.168% by weight, the content of hydrolyzable chlorine was 0.067% by weight, viscosity measured by an E-type viscometer was 1.6 Pa.s at 25° C., the loss ratio of epoxy groups measured by a titration method of perchloric acid was 8.0%, and the hydrogenation ratio of an aromatic ring measured by a nuclear magnetic resonance analysis was approximately 100%.

Preparation Example 2

The same operations were followed as in the above-described preparation Example 1, except that the reaction period was changed to 90 minutes to obtain 96.1 g of a hydrogenated epoxy resin.

In the hydrogenated epoxy resin, the content of total chlorine was 0.165% by weight, the content of hydrolyzable chlorine was 0.066% by weight, viscosity was 1.9 Pa.s at 25° C., the loss ratio of epoxy groups was 4.5%, and the hydrogenation ratio of an aromatic ring was 90%.

Preparation Example 3

The same operations were followed as in the preparation Example 1, except that aromatic epoxy resin was changed to 50 g of Epikote 180H65 (trade name by Yuka Shell Epoxy K.K.: a polyglycidyl ether of a cresol novolak, a total chlorine content of 0.089% by weight, an epoxy equivalent of 204 g/eq.), tetrahydrofran was changed to 200 g, and the reaction period was changed to 5 hours to obtain 46.3 g of a hydrogenated epoxy resin.

In the hydrogenated epoxy resin, the content of total chlorine was 0.090% by weight, the content of hydrolyzable chlorine was 0.033% by weight, the loss ratio of epoxy groups was 10.3%, and the hydrogenation ratio of an aromatic ring was 91%.

Example 1

100 parts of the hydrogenated epoxy resin obtained in the Preparation Example 1 and 84 parts of methylhydrophthalic anhydride (MH700: trade name by Shin-Nihon Rika, Co., Ltd.) were mixed at temperature of 70° C., followed by removing bubbles to prepare a uniform solution, and followed by adding 1 part of a salt (SA102: trade name by Sun-apro, Co., Ltd.) of 1,5-diazabicyclo(5, 4, 0)undecene-7 with octylic acid while agitating and mixing to obtain an epoxy resin composition.

Subsequently, the above-described composition was cast into a mold, followed by curing at 100° C. for 3 hours, and further at 130° C. for 6 hours in an oven to obtain a cured resin. Physical properties of the cured resin are shown in Table 1.

Example 2

The same operations were followed as in the Example 1, except that the epoxy resin was changed to 100 parts of the hydrogenated epoxy resin obtained in the Preparation Example 2, and MH700 was changed to 87 parts to obtain a composition and a cured article. Physical properties of the cured resin are shown in Table 1.

Example 3

The same operations were followed as in the Example 1, except that the epoxy resin was changed to 100 parts of the hydrogenated epoxy resin obtained in the Preparation Example 3, and MH700 was changed to 77 parts to obtain a composition and a cured article. Physical properties of the cured resin are shown in Table 1.

Comparative Example 1

The same operations were followed as in the Example 1, except that the epoxy resin was changed to 100 parts of HBE-100 (trade name by Shin-Nihon Rika, Co., Ltd.: a diglycidyl ether of a hydrogenated bisphenol A, a total chlorine content: 4.98% by weight, the content of hydrolyzable chlorine: 1.57% by weight, and an epoxy equivalent: 216 g/eq.), and MH700 was changed to 78 parts to obtain a composition and a cured resin. Physical properties of the cured resin are shown in Table 1.

Comparative Example 2

The same operations were followed as in the Preparation Example 1, except that the catalyst for hydrogenation was changed to 50 g of a tetrahydrofran solution of a homogenous Ruthenium catalyst obtained from Ruthenium trichlorohydrate and magnesium powder, and reaction period was changed to 8 hours to obtain 91.3 g of a hydrogenated epoxy resin.

In the hydrogenated epoxy resin, the content of total chlorine was 1.060% by weight, the content of hydrolyzable chlorine was 0.870% by weight, viscosity was 1.8 Pa.s at 25° C., the loss ratio of epoxy groups was 6.5%, and the hydrogenation ratio of an aromatic ring was 93%. Further, a long time was required in filtration because the catalyst for hydrogenation in reaction liquid was a very fine powder. Still further, the hydrogenated epoxy resin obtained colored light brown. It is assumed that the catalyst was not able to be completely filtered.

Subsequently, the same operations were followed as in the Example 1, except that the epoxy resin was changed to 100 parts of the hydrogenated epoxy resin, and MH700 was changed to 86 parts to obtain a composition and a cured resin. Physical properties of the cured resin are shown in Table 1.

Example 4

100 parts the hydrogenated epoxy resin obtained in the Preparation Example 1 and 22 parts of isophorone diamine were mixed at room temperature, followed by removing bubbles to prepare a uniform solution and to obtain an epoxy resin composition.

Subsequently, the above-described composition was cast into a mold, followed by curing at 23° C. for 24 hours, and further at 100° C. for 3 hours in an oven to obtain a cured resin. Physical properties of the cured resin are shown in Table 2.

Example 5

The same operations were followed as in the Example 4, except that the epoxy resin was changed to 100 parts of the hydrogenated epoxy resin obtained in the Preparation Example 2, and isophorone diamine was changed to 23 parts to obtain a composition and a cured resin. Physical properties of the cured resin are shown in Table 2.

Comparative Example 3

The same operations were followed as in the Preparation Example 1, except that the catalyst for hydrogenation was changed to 0.5 g of a catalyst (specific area of 1200 m²/g) composed of 5 wt %-rhodium/95 wt %-activated carbon to obtain 94.3 g of a hydrogenated epoxy resin.

In the hydrogenated epoxy resin, the content of total chlorine was 0.162% by weight, the content of hydrolyzable chlorine was 0.067% by weight, viscosity was 7.6 Pa.s at 25° C., the loss ratio of epoxy groups was 5.3%, and the hydrogenation ratio of an aromatic ring was 43%.

Subsequently, the same operations were followed as in the Example 4, except that there was employed 100 parts of the epoxy resin, and isophorone diamine was changed to 24 parts to obtain a composition and a cured resin. Physical properties of the cured resin are shown in Table 2.

Comparative Example 4

The same operations were followed as in the Preparation Example 1, except that the catalyst for hydrogenation was changed to 0.5 g of ruthenium oxide (manufactured by NE Chemcat) to obtain 90.5 g of a hydrogenated epoxy resin.

In the hydrogenated epoxy resin, the content of total chlorine was 0.175% by weight, the content of hydrolyzable chlorine was 0.060% by weight, viscosity was 2.7 Pa.s at 25° C., the loss ratio of epoxy groups was 28.5%, and the hydrogenation ratio of an aromatic ring was approximately 100%. Further, a long time was required in filtration because the ruthenium oxide in reaction liquid, which was employed as a catalyst for hydrogenation, was a very fine powder similarly to the Comparative Example 2. Still further, the hydrogenated epoxy resin obtained colored light brown. It is assumed that the ruthenium oxide was not be able to be completely filtered.

Subsequently, the same operations were followed as in the Example 4, except that there was employed 100 parts of the hydrogenated epoxy resin, and isophorone diamine was changed to 18 parts to obtain a composition and a cured resin. Physical properties of the cured resin are shown in Table 2.

TABLE 1

|  |  | Exam. 1 | Exam. 2 | Exam. 3 | CE-1 | CE-2 |
|---|---|---|---|---|---|---|
| Mixing amount (part) | Epoxy resin | PE-1 (100) | PE-2 (100) | PE-3 (100) | HBE-100 (100) | CE-2 (100) |
|  | Curing agent | MH700 (84) | MH700 (87) | MH700 (77) | MH700 (78) | MH700 (86) |
|  | Accelerator | SA102 (1) | SA102 (1) | SA102 (1) | SA102 (1) | SA102 (1) |
| Gelation time (minute)*1 |  | 53 | 50 | 46 | 68 | 51 |
| HDT (° C.)*2 |  | 136 | 138 | 165 | 123 | 134 |
| Moisture Absorption Ratio (%)*3 |  | 1.10 | 1.16 | 1.34 | 1.61 | 1.39 |
| Electric Conductivity (S/cm)*4 |  | 37 | 34 | 26 | 160 | 73 |

*1Measured with a Gelation time Tester (manufactured by Yasuda Seiki, Co., Ltd.) at 100° C.
*2Heat distortion temperature (ASTM-D-648)
*3Increase ratio versus initial weight in the cured resin after cured resin was placed under the conditions of 85° C. and relative humidity of 85% for 168 hours.
*4Electric conductivity in water extracted from 10 g of cured article powder passed through a 100 mesh sieve, at 95° C. for 20 hours with 90 g of pure water.

TABLE 2

|  | Exam. 4 | Exam. 5 | CE-3 | CE-4 |
|---|---|---|---|---|
| Epoxy resin | PE-1 (100) | PE-2 (100) | CE-3 (100) | CE-4 (100) |
| Curing agent (isophorone diamine) | (22) | (23) | (24) | (18) |
| Pot life (minute)*1 | 80 | 75 | 57 | 103 |
| HDT (° C.)*2 | 118 | 122 | 125 | 99 |
| Water absorption ratio (%)*3 | 0.32 | 0.34 | 0.41 | 0.65 |
| Retention ratio of Gloss (%)*4 after 500 hours | 77 | 72 | 14 | 61 |
| after 1000 hours | 62 | 53 | 5 | 35 |

*1 23° C., sample amount of 100 g.
*2 ASTM-D-648.
*3 Water absorption ratio after immersed in pure water at 23° C. for 1 week.
*4 Xenon Tester (manufactured by Shimadzu Corporation) Formulated with 20 wt % of titanium oxide, thickness of film, approximately 1 mm.

Abbreviations in Epoxy resin in Tables 1 and 2 are as follows:

Exam.:Example
PE-1: Preparation Example 1
PE-2: Preparation Example 2
PE-3: Preparation Example 3
CE-1: Comparative Example 1
CE-2: Comparative Example 2
CE-3: Comparative Example 3
CE-4: Comparative Example 4

A cured product from the epoxy resin composition of the present invention is well-balanced in weatherability, heat resistance, and moisture resistance, in which a hydrogenated epoxy resin having a lower chlorine content than a conventional resin is cured with a curing agent. Therefore, the cured resin can be utilized and developed in a wide range of use and, particularly, it can be advantageously employed in electric-electronic fields such as encapsulants for semiconductors and electric insulators, uses for weatherable coatings, etc.

We claim:

1. An epoxy resin composition comprising a hydrogenated epoxy resin produced by hydrogenating an aromatic epoxy resin, wherein said hydrogenated epoxy resin has a hydrogenation ratio in an aromatic ring of not less than 85%, a loss ratio of epoxy groups of not more than 20%, and a total chlorine content of not more than 0.3% by weight.

2. The epoxy resin composition of claim 1 wherein said hydrogenated epoxy resin is a liquid epoxy resin which is produced by hydrogenation of a bisphenol A based epoxy resin, and which has a viscosity of not more than 2.5 Pa.s at 25° C. which is measured by a rotation-type viscometer.

3. The epoxy resin composition of claim 1 wherein said hydrogenated epoxy resin is an epoxy resin produced by hydrogenation of a novolak type epoxy resin having an epoxy equivalent of 150–230 represented by the general formula (1), (1)

$$H_2C-CH-CH_2 \quad H_2C-CH-CH_2 \quad H_2C-CH-CH_2$$

wherein $R^1$, $R^2$, and $R^3$ are independently hydrogen atom or an alkyl group having a carbon number of 1–4, n is the number of 0–10, and Z is a hydrogen atom or a formula, wherein $R^1$, $R^2$, and $R^3$ are independently hydrogen atom or an alkyl group having a carbon number of 1–4.

4. The epoxy resin composition as recited in claim 2 wherein the content of hydrolyzable chlorine in said hydrogenated epoxy resin is not more than 0.1% by weight.

5. The epoxy resin composition as recited in claim 3 wherein the content of hydrolyzable chlorine in said hydrogenated epoxy resin is not more than 0.1% by weight.

6. A process for producing a hydrogenated epoxy resin composition comprising the steps of hydrogenating an aromatic epoxy resin in the presence of a catalyst at a pressure within the range of 1–30 MPa, at a temperature within the range of 30–150° C., wherein said catalyst comprises rhodium or ruthenium carried on a graphite having a surface area ranging from 10 m2/g to 400 m2/g.

7. The process of claim 6 wherein the aromatic epoxy resin is a bisphenol A based epoxy resin.

8. The process of claim 6 wherein the aromatic epoxy resin is of a novolak type epoxy resin having an epoxy equivalent of 150–230 represented by the general formula (1),

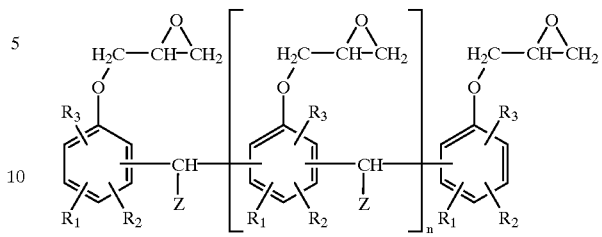
(1)

wherein $R^1$, $R^2$, and $R^3$ are independently hydrogen atom or an alkyl group having a carbon number of 1–4, n is the number of 0–10, and Z is a hydrogen atom or a formula,

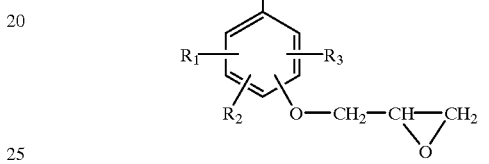

wherein $R^1$, $R^2$, and $R^3$ are independently hydrogen atom or an alkyl group having a carbon number of 1–4.

* * * * *